(12) United States Patent
Sakamoto et al.

(10) Patent No.: US 11,763,793 B2
(45) Date of Patent: Sep. 19, 2023

(54) SILENT DEVICE FOR AIR CONDITIONING EQUIPMENT

(71) Applicant: Foster Electric Company, Limited, Tokyo (JP)

(72) Inventors: Yuichi Sakamoto, Tokyo (JP); Mitsuharu Watanabe, Tokyo (JP)

(73) Assignee: Foster Electric Company, Limited, Tokyo (JP)

( * ) Notice: Subject to any disclaimer, the term of this patent is extended or adjusted under 35 U.S.C. 154(b) by 0 days.

(21) Appl. No.: 17/780,793

(22) PCT Filed: Sep. 29, 2020

(86) PCT No.: PCT/JP2020/036979
§ 371 (c)(1),
(2) Date: May 27, 2022

(87) PCT Pub. No.: WO2021/106359
PCT Pub. Date: Jun. 3, 2021

(65) Prior Publication Data
US 2022/0415302 A1    Dec. 29, 2022

(30) Foreign Application Priority Data

Nov. 28, 2019    (JP) .................................. 2019-214979

(51) Int. Cl.
*A61F 11/06* (2006.01)
*G10K 11/178* (2006.01)
*F24F 13/02* (2006.01)
*F24F 13/24* (2006.01)

(52) U.S. Cl.
CPC .... *G10K 11/17857* (2018.01); *F24F 13/0263* (2013.01); *F24F 13/24* (2013.01); *G10K 11/17861* (2018.01); *G10K 2210/105* (2013.01); *G10K 2210/112* (2013.01)

(58) Field of Classification Search
CPC ....... G10K 11/17857; G10K 11/17861; G10K 2210/105; G10K 2210/112; F24F 13/0263; F24F 13/24
USPC ................................................ 381/71.1, 71.5
See application file for complete search history.

(56) References Cited

FOREIGN PATENT DOCUMENTS

| CN | 104534532 B | | 4/2015 |
|----|-------------|---|--------|
| CN | 104848432 A | * | 8/2015 |
| CN | 104848432 A | | 8/2015 |
| JP | H05-172099 | | 7/1993 |

(Continued)

OTHER PUBLICATIONS

Extended European Search Report; European Patent Office; EP20892965; dated Dec. 13, 2022; Entire document.

(Continued)

*Primary Examiner* — Ammar T Hamid
(74) *Attorney, Agent, or Firm* — Allen, Dyer, Doppelt & Gilchrist, P.A.

(57) ABSTRACT

A reference microphone for detecting noise is located under a first duct. The noise is in the form of a first plane wave in the first duct. A speaker is located on a top of the first duct. Connected to an upper part of the first duct is a second duct including an error microphone. The first plane wave in the first duct passes through an acoustic path and reaches the second duct. The error microphone detects the sound, and the speaker outputs a second plane wave with an opposite phase for canceling the first plane wave.

5 Claims, 16 Drawing Sheets

(56) References Cited

FOREIGN PATENT DOCUMENTS

| JP | H07-98591 A | 4/1995 |
|---|---|---|
| JP | H08-272374 A | 10/1996 |
| JP | 2010-256896 A | 11/2010 |
| JP | 2017083652 A | 5/2017 |
| WO | WO2014051883 A1 | 4/2014 |
| WO | WO2017217270 A1 | 12/2017 |
| WO | WO2019124772 A1 | 6/2019 |

OTHER PUBLICATIONS

Japanese Patent Office; International Search Report for PCT/JP2020/036979; dated Dec. 1, 2020; entire document.

* cited by examiner

SILENT DEVICE FOR AIR CONDITIONING EQUIPMENT

CROSS-REFERENCE TO RELATED APPLICATIONS

This application is the § 371 National Stage Entry of International Application No. PCT/JP2020/036979, filed on Sep. 29, 2020, which claims the benefit of Japanese Patent Application No. 2019-214979, filed on Nov. 28, 2019, the contents of which applications are herein incorporated by reference in their entirety.

FIELD OF THE INVENTION

The present disclosure relates to a silencer for an air conditioner, and more particularly, to a silencer for silencing air-conditioning noise caused by an air conditioner in a vehicle such as an automobile.

BACKGROUND OF THE INVENTION

Gasoline engines and diesel engines have been the main drive sources for automobiles. In recent years, hybrid vehicles or electric vehicles including an electric motor as a part of a driving source to reduce greenhouse gas emissions such as carbon dioxide are rapidly spreading as a measure against the global warming.

Accordingly, hybrid vehicles cause less engine noise, whereas electric vehicles cause no engine noise and bring silence. Other than the engine noise, there are road noise within a range from 50 Hz to 500 Hz generated when tires roll on a road surface during a travel of an automobile, booming noise of 100 Hz or less caused by cabin resonance, fluid noise generated around side mirrors, and air-conditioning noise of tens of hertz to 10000 Hz generated by air-conditioning of an air conditioner.

Out of these, the air-conditioning noise is hard on the ears of an occupant.

In recent years, there is an increasing number of large people, and an increasing number of big families and groups moving in vehicles. There is thus a demand for vehicles, such as minivans, with three-row seats and a wider interior space. In addition to minivans, passenger vehicles with three-row seats are available.

This type of vehicle includes an air conditioner attached near the rear seats to provide a comfortable space. Once the air conditioner operates, vibrations of a fan sucking outside air and aerodynamic noise of the sucked air are generated over a wide frequency range.

In a comfortable vehicle with a wider interior space, an occupant tends to enjoy music, videos, and other entertainment, However, noise from the air conditioner near the rear seats are hard on the ears.

There is a silencer called a "passive control (PNC) system" as a noise reduction system of a sound absorbing material.

CITATION LIST

Patent Document

Patent Document 1: Japanese Unexamined Patent Publication No. H05-172099.

A device according to Patent Document 1 includes an air intake member made of glass wool in an air flow passage to convert the noise generated at an intake side of a fan into thermal energy in the sound absorbing material and to eliminate noise. Other typical sound absorbing materials include an urethane foam or felt.

Sound absorbing materials eliminate or reduce noise 1000 Hz or more but fail to eliminate low-frequency noise less than the above frequency.

The sound absorbing function is determined by the material and amount of a sound absorbing material. In order to increase the sound absorption efficiency, a larger amount of a sound absorbing material is needed. This requires a large structure and a large space and is thus not suitable for reducing the size and weight. In addition, the background art fails to cope with the type and change (e.g., from a lower range to a higher range or in the magnitude) of noise.

SUMMARY OF THE INVENTION

The present disclosure was made in view of the foregoing. It is an objective of the present disclosure to provide a silencer, for an air conditioner, capable of eliminating low-frequency noise and exhibiting desired silencing performance.

According to the present disclosure, a silencer for an air conditioner includes: a first duct in a cylindrical shape at a noise outlet, the first duct including a reference microphone that detects noise as a reference signal; a speaker baffle on a top of the first duct, the speaker baffle having a circular shape as whole in a plan view and including a speaker around a center thereof; a back enclosure for the speaker, the back enclosure being on a back surface of the speaker baffle; a second duct that is in a shape of a cylinder and connected to a top of the speaker baffle; an error microphone in the second duct and above a diaphragm of the speaker at a distance to detect a control target signal which is an incompletely eliminated error signal; a cylindrical body for intake connected to a top of the second duct; and a duct cover for closing an upper opening of the cylindrical body. A gap that is between an inner circumferential surface of the first duct and an outer circumferential surface of the back enclosure for the speaker and serves as an acoustic path of noise to provide a plane wave. The noise is in a form of a first plane wave. The error microphone is configured to detect an error signal in the second duct. The speaker is configured to output a second plane wave with a phase opposite to a phase of the first plane wave.

According to an aspect of the present disclosure, the silencer further includes: an ANC system connected to the speaker. The reference signal detected by the reference microphone is input to the ANC system connected to the reference microphone. The control target signal of the error microphone is input to the ANC system. An output of the ANC system is applied to the speaker connected. The speaker sends out the second plane wave.

According to another aspect of the present disclosure, in the silencer, the acousting path in the first duct includes a sound absorbing material.

According to a further aspect of the present disclosure, in the silencer, the duct cover has an inner surface including a cylinder serving as a wind shield and a reinforcement for the error microphone.

According to an additional aspect of the present disclosure, in the silencer, the back enclosure for the speaker has a U-shaped side section.

According to the present disclosure, the silencer for the air conditioner located at the noise outlet functions as a sound absorbing duct and eliminates even low-frequency noise unable to be eliminated by a typical silencer made of only a sound absorbing material.

According to an aspect of the present disclosure, the silencer includes the ANC system that generates a phase opposite to the phase of noise to attenuate the sound pressure of low-frequency noise and further improves the silencing effect.

According to another aspect of the present disclosure, the sound absorbing member including, as a main material, the fibers with a high silencing effect is incorporated to eliminate noise over a wide frequency range from a low frequency to 1000 Hz or more.

According to a further aspect of the present disclosure, the duct cover has a higher rigidity to function as a sound absorbing duct with a higher strength, cause less vibrations, shields the error microphone from wind, and reliably operate the error microphone.

According to an additional aspect of the present disclosure, the speaker has the back enclosure with a U-shaped side section forming an acoustic path, which smoothly guides the air and sound passing through the acousting path and reduces noise.

BRIEF DESCRIPTION OF THE DRAWINGS

FIG. 17 illustrates noise reduction characteristics when an ANC system is on.

DETAILED DESCRIPTION OF PREFERRED EMBODIMENTS

Now, a preferred embodiment of the present disclosure will be described with reference to the drawings.

The present disclosure was made as a measure against noise of a system called a "heating, ventilation, and air conditioning (HVAC) system". This "HVAC system" is a generic term for a module component with air-conditioning functions integrated and is an on-vehicle air conditioner with functional components, such as a heater, a blower, and an air conditioner, integrated.

Figure 19:
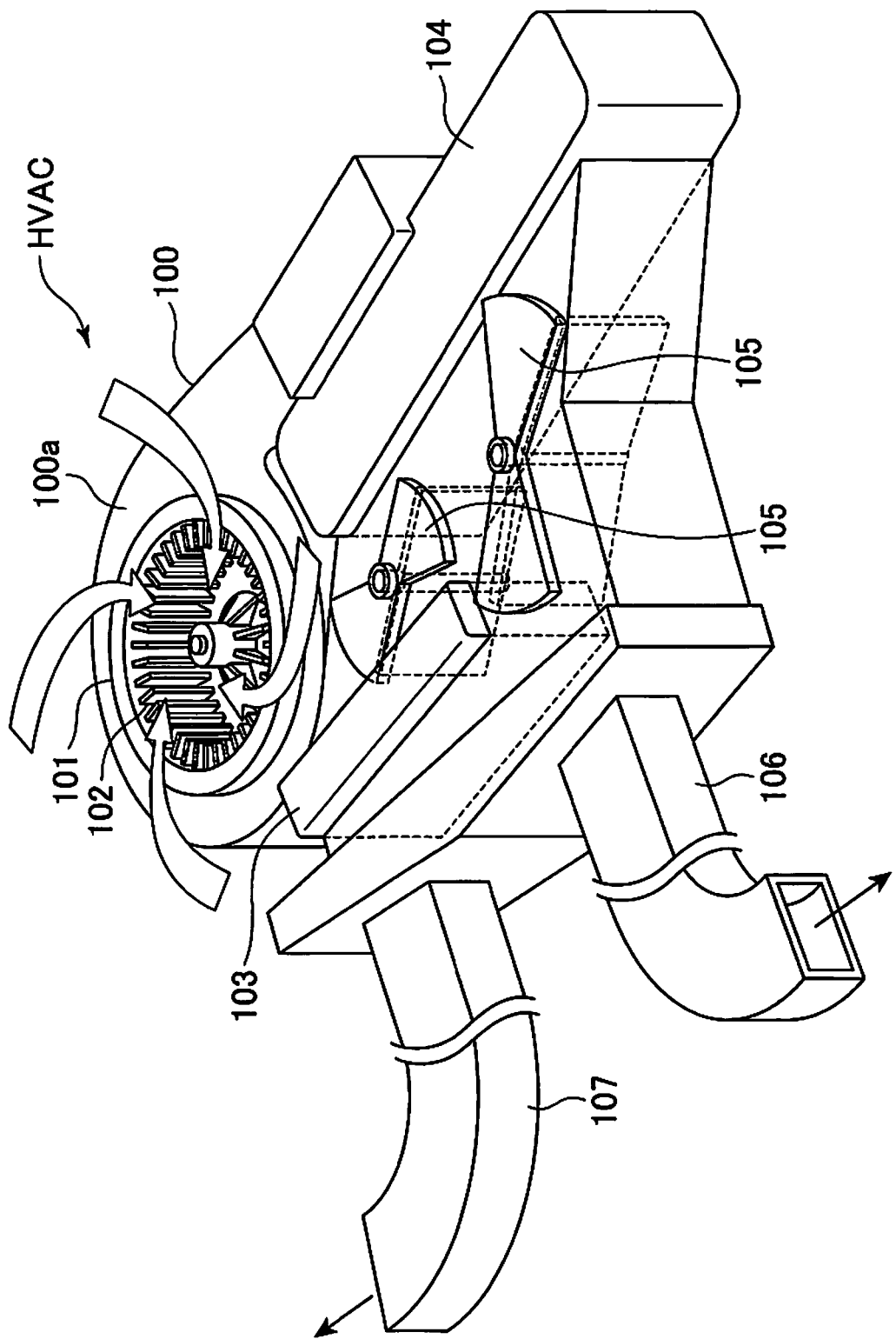
FIG. 19 is a schematic perspective view of an on-vehicle air conditioning unit.

FIG. 19 is a schematic configuration diagram of an HVAC system. Reference character 100 denotes a case of the HVAC system with an upper surface 100a partially including a circular air inlet 101, in the state shown in the figure. Located inside is a rotatable fan 102 connected to a motor (not shown). The fan 102 is a centrifugal blower with a plurality of radial flat blades.

The HVAC includes a radiator 103 functioning as a heater, an evaporator 104, and a shutter 105, for example.

In an operation, the air sucked into the case 100 through the air inlet 101 by the rotating fan 102 is cooled by the evaporator 104 or heated by the radiator 103 as indicated by an arrow, mixed at the degree regulated by the shutter 105, and then discharged through a discharge port. The air discharged from the HVAC system passes through a duct 106 to the foot of a passenger compartment and is sent through another duct 107 and an overhead air outlet to the passenger compartment around the rear seats (seats in the second and third rows).

This HVAC is typically located in the interior material and the outer plate next to the seating surface of the seats in the third row. Once the HVAC is activated, the case 100 and the air inlet 101 emit the wide frequency-range operating noise caused by vibrations and aerodynamic noise. This operating noise passes through the interior material and the gaps between the interior components so as to become considerable noise for an occupant near the seats in the third row.

To address the problem, an HVAC system is attached with a silencer for an air conditioner according to the embodiment of the present disclosure.

Figure 1:
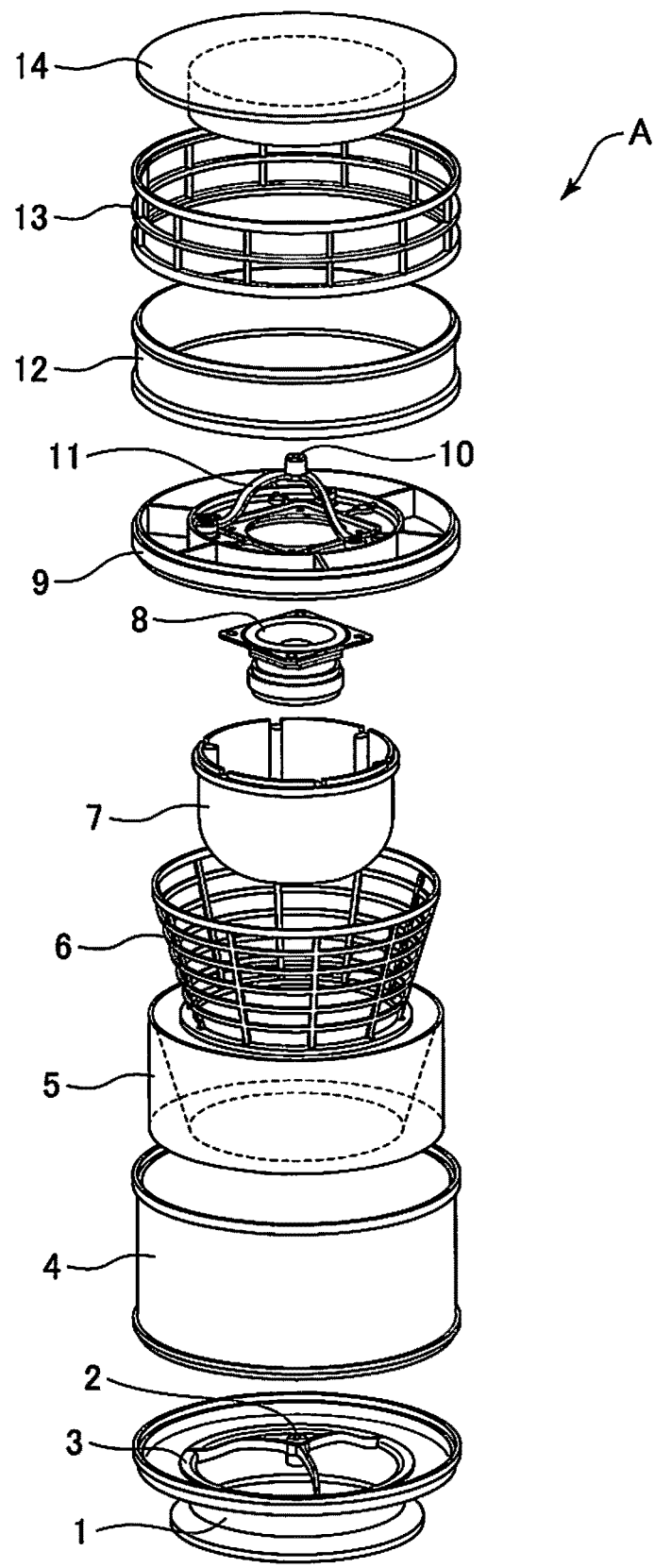
FIG. 1 is an exploded perspective view of a silencer for an on-vehicle air conditioner according to an embodiment.

FIG. 1 is an exploded perspective view of a silencer A for an air conditioner according to the embodiment of the present disclosure. The silencer A employs active noise control (ANC) for a low-frequency range and PNC for a high-frequency range to eliminate noise.

In FIG. 1, reference character 1 denotes a substantially cylindrical duct base attached to the top of a circular air inlet 101 of a case 100 of the HVAC shown in FIG. 19, and serving a connector. Reference character 2 denotes a reference microphone, reference character 3 denotes a reference microphone mounting member, reference character 4 denotes a first duct in a cylindrical shape, reference character 5 denotes a sound absorbing material set in the first duct 4, reference character 6 denotes a holder for the sound absorbing material 5, in the shape of a substantially inverted circular truncated cone, reference character 7 denotes a back enclosure for a speaker 8, reference character 8 denotes the speaker, reference character 9 denotes a speaker baffle, reference character 10 denotes an error microphone, reference character 11 denotes an error microphone mounting member, reference character 12 denotes a second duct in a cylindrical shape, reference character 13 denotes a cylindrical basket for sucking air, and reference character 14 denotes a duct cover.

Figure 2:
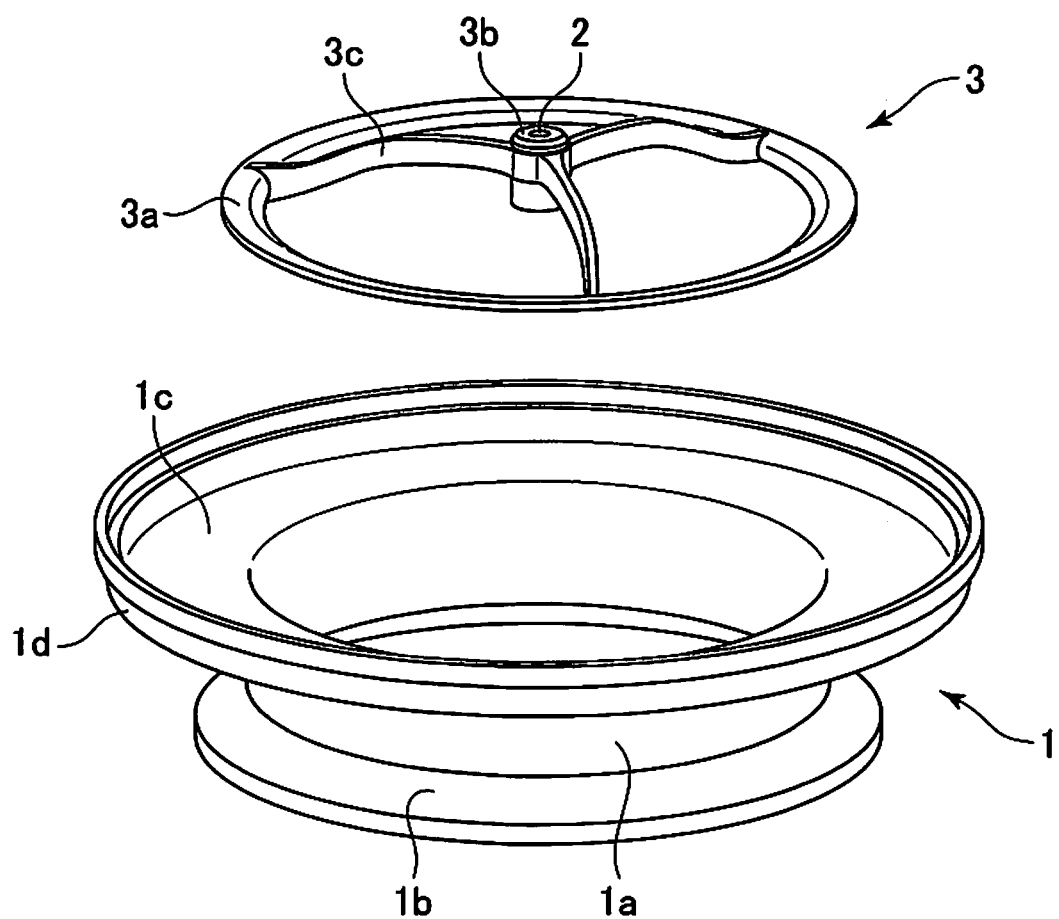
FIG. 2 is a perspective view of a duct base and a reference microphone mounting member, which are constituent members of the silencer for the on-vehicle air conditioner.

FIG. 2 is a perspective view of the duct base 1, the reference microphone mounting member 3 attached to the duct base 1, and the reference microphone 2 mounted on the reference microphone mounting member 3.

The duct base 1 includes: a cylindrical body 1a; a flange-like part 1b under the body 1a, and a flange 1c protruding outward from the body 1a. The part 1b is to be attached to the case of an HVAC system. The part 1b is attached to the case 100 on the outer circumference of the fan 102 shown in FIG. 19 by an appropriate fixing means such as bolts, nuts, ultrasonic welding, or adhesion.

Attached to the upper surface of the flange 1c by an appropriate fixing means such as adhesion or ultrasonic welding is a reference microphone mounting member 3. The reference microphone mounting member 3 in the shape of a wheel and includes an annular rim 3a, a microphone mount 3b, and a plurality of spokes 3c. The annular rim 3a is attached to the upper surface of the flange 1c. The microphone mount 3b is in a cylindrical shape and located at the center of the reference microphone mounting member 3. The spokes 3c are arranged at intervals in the circumferential direction between the outer circumference of this microphone mount 3b and the inner circumference of the rim 3a. The reference microphone 2 is placed at the center of the microphone mount 3b. This reference microphone 2 is to detect the noise generated by the HVAC system.

Extending along the outer circumference of the flange 1c is rib-like connector 1d protruding upward.

Figure 3:
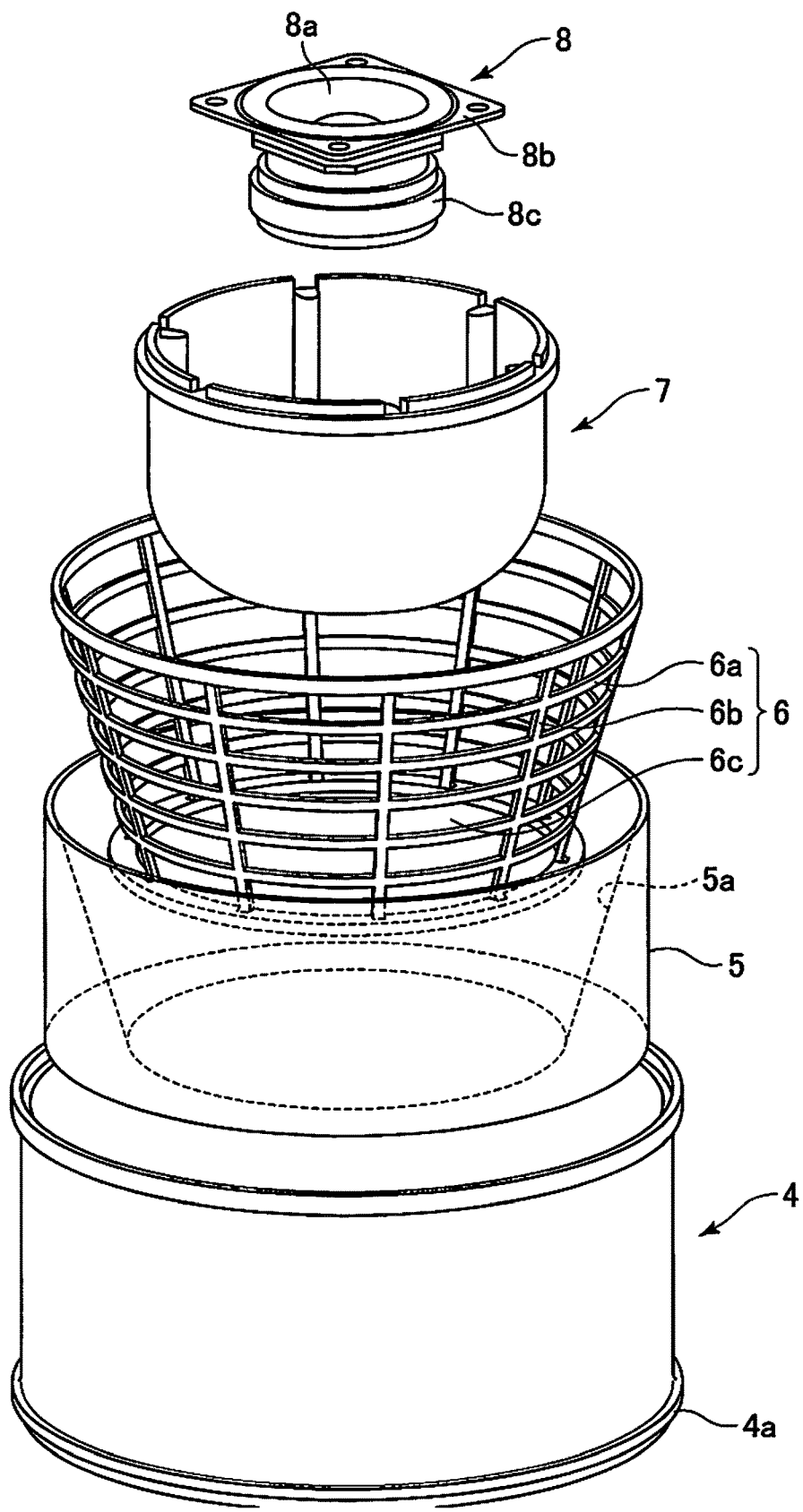
FIG. 3 is a perspective view of a first duct, a sound absorbing material, a holder for the sound absorbing material, a back enclosure for a speaker, and the speaker, which are constituent members of the silencer for the on-vehicle air conditioner.

FIG. 3 shows the first duct 4 in a cylindrical shape, the sound absorbing material 5 in the first duct 4 as necessary, the holder 6 for the sound absorbing material 5, the back enclosure 7 of the speaker 8, and the speaker 8.

The first duct 4 includes, at the bottom, a duct connector 4a protruding outward which is inserted into the rib-like connector 1d of the duct base 1 to connect the first duct 4 to the duct base 1.

The sound absorbing material 5 extends along the inner circumferential surface of the first duct 4. The sound absorbing material 5 has a substantially cylindrical shape as a whole, and an inner circumferential surface as a conical tapered surface 5a. The tapered surface 5a has an inner radius decreasing from the top to the bottom. This shape is to quickly guide the air from the top to the bottom. The sound absorbing material 5 includes nanofiber fibers with a high sound absorption coefficient in a high-frequency range in one preferred embodiment. In this embodiment, the sound absorbing material 5 includes nanofiber fibers.

Referring back to FIG. 3, reference character 6 denotes a holder for the sound absorbing material, in the shape of an inverted circular truncated cone. The holder 6 has an inner radius gradually increasing from the bottom to the top, and includes a plurality of ring members 6a at intervals and a plurality of ring connecting members 6b connecting the ring members 6a. The sound absorbing material 5 is attached and sandwiched between the inner circumferential surface of the first duct 4 and the holder 6. The ring connecting members 6b are also arranged at intervals in the circumferential direction. Interposed between the ring members 6a and the ring connecting members 6b are windows 6c to expose the tapered surface 5a of the sound absorbing material 5 and absorb noise. If the sound absorbing material 5 is a molded product bonded and fixed to the inner circumferential surface of the first duct 4, the holder 6 may not be provided.

Figure 4:
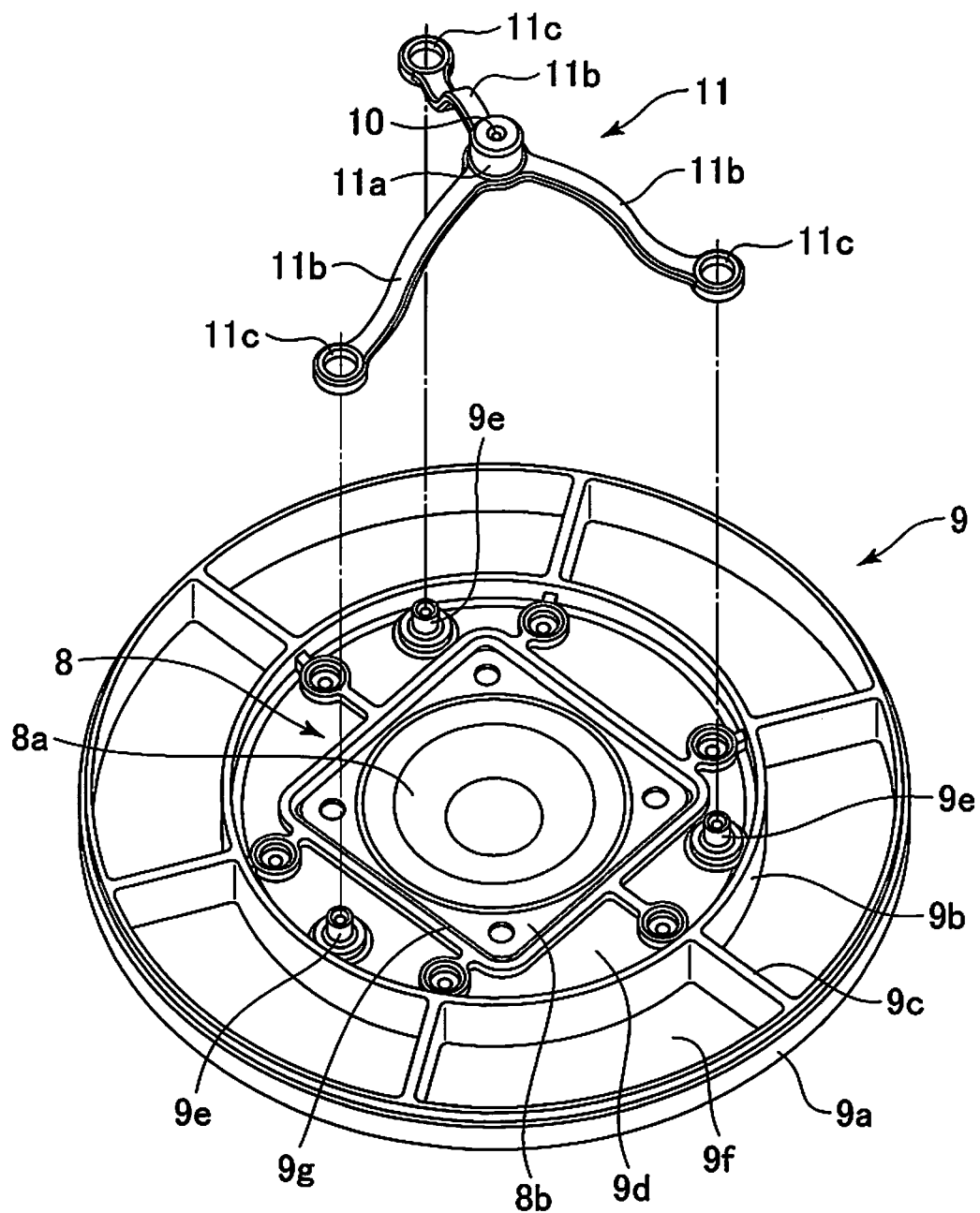
FIG. 4 is a perspective view of a speaker baffle and an error microphone mounting member, which are constituent members of the silencer for the on-vehicle air conditioner according to the embodiment. The error microphone mounting member is attached to this speaker baffle.

The back enclosure 7 for the speaker with a U-shaped side section is located around the center of the first duct 4. The speaker 8 is located at an upper center of this back enclosure 7 for the speaker. Reference character 8a denotes a diaphragm of the speaker, 8b denotes a speaker mounting plate, and reference character 8c denotes a magnetic circuit. As shown in FIG. 4, the speaker 8 is attached to the speaker baffle 9 in a circular shape as a whole in a plan view.

The speaker baffle 9 includes an outer ring 9a on the outer circumference, an inner ring 9b, and an arm 9c. The outer ring 9a is connected to the top of the first duct 4 (see FIG. 6). The inner ring 9b is spaced inside and concentric with this outer ring 9a. The arm 9c connects these outer and inner rings 9a and 9b. The outer ring 9a, the inner ring 9b, and the arm 9c define a space serving as a vent 9f.

Located inside the inner ring 9b is a disk-like mounting plate 9d that also functions as a front battle of the speaker 8. The mounting plate 9d has a plurality of cylindrical projections 9e at intervals on the outer circumference. These projections 9e are for attaching the error microphone mounting member 11.

Specifically, the error microphone mounting member 11 is formed into the shape of a stand. The error microphone mounting member 11 includes, at the center, a cylindrical microphone mount 11a with the center at which the error microphone 10 is set. The microphone mount 11a includes, on the outer circumference, a plurality of radially extending curved arms 11b each having, at its distal end, an attaching hole 11c into which one of the projections 9e is inserted to attach the error microphone mounting member 11. The projections 9e are inserted into the attaching holes 11c to attach or fix the error microphone mounting member 11 to the mounting plate 9d by a mounting means such as an adhesive, ultrasonic welding, or screws. In this case, the error microphone 10 is placed at a predetermined distance above the speaker 8 by the curved arms 11b protruding upward to lift the error microphone 10.

The mounting plate 9d includes a rectangular speaker mount 9g corresponding to the shape of the speaker mounting plate 8b, and mounted with the speaker 8 by an appropriate mounting means.

The top of the back enclosure 7 for the speaker is mounted on the back surface of the mounting plate 9d by an appropriate mounting means.

Figure 5:
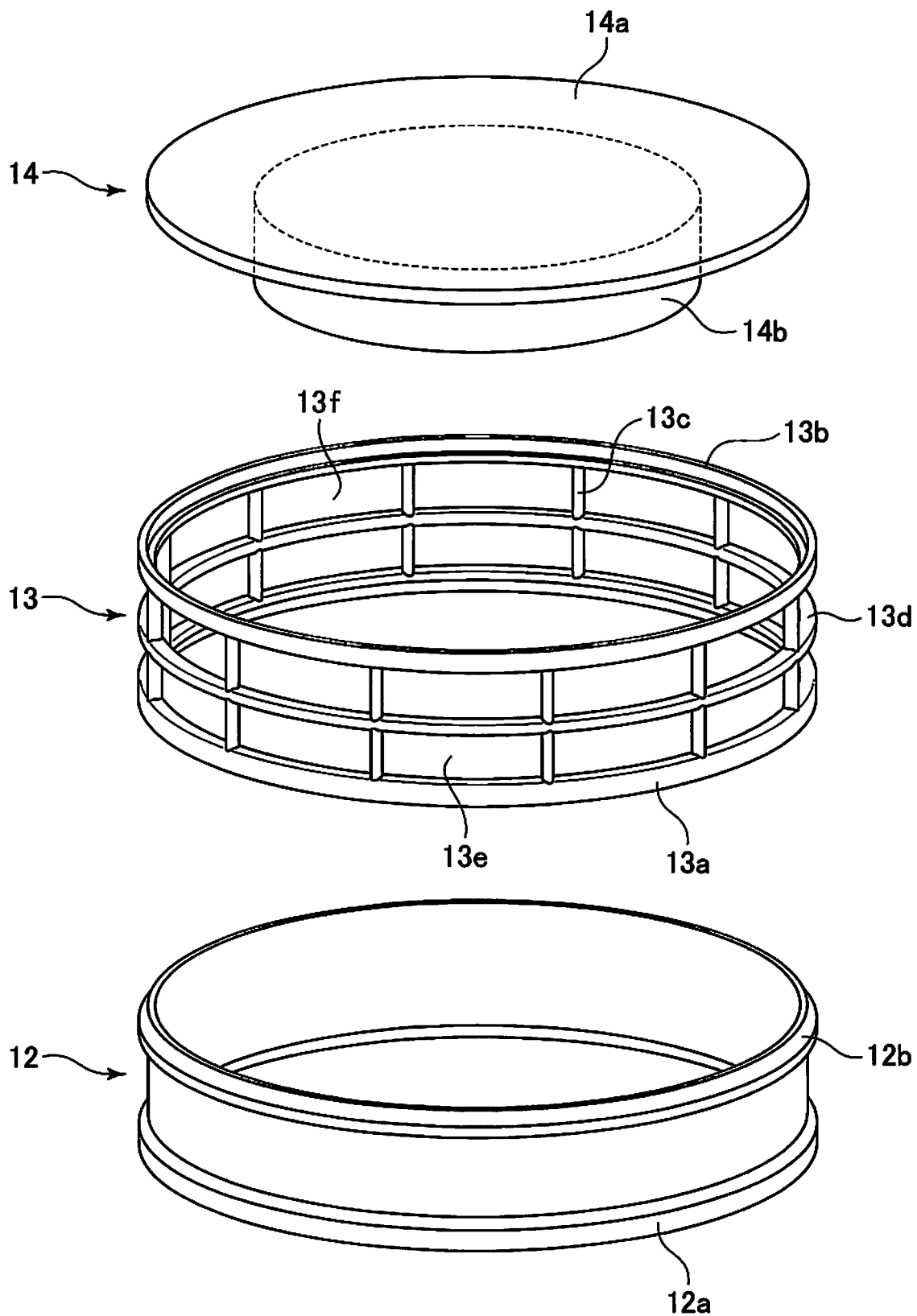
FIG. 5 is a perspective view of a second duct, a cylindrical basket for taking air in and discharging cancellation sound, and a duct cover, which are constituent members of the silencer for the on-vehicle air conditioner according to the embodiment.

As shown in FIG. 5, the second duct 12 has almost the same outer diameter as the first duct 4. The second duct 12 includes first and second connectors 12a and 12b with a large thickness on the bottom and the top, respectively. The first connector 12a on the bottom is connected to the top of the outer ring 9a of the speaker baffle 9 by an appropriate attaching means. The second connector 12b on the top is connected to a first ring 13a on the bottom of the cylindrical basket 13.

The cylindrical basket 13 includes the first ring 13a connected to the top of the second duct 12, and a second ring 13b having the same radius as the first ring 13a and spaced above and opposed to the first ring 13a. The first and second rings 13a and 13b are connected by a plurality of bar-like connectors 13c extending in the vertical direction. The connectors 13c are arranged at intervals as appropriate. Interposed between the first and second rings 13a and 13b is a reinforcing ring 13d. The number of the reinforcing ring 13d is one in the shown example, but is not limited to one. Interposed among the first and second rings 13a and 13b, the connectors 13c, and the reinforcing ring 13d, which is provided as necessary, are vents 13e. Through these vents 13e, outside air 20 (see FIG. 14) is sucked inside, and controlled sound after the cancellation is emitted.

The cylindrical basket 13 has an upper opening 13f closed by the duct cover 14. The duct cover 14 includes a disk-like top plate 14a, and a cylinder 14b protruding from the inner surface of the top plate 14a and functioning as a wind shield and a reinforcement for the error microphone 10. The cylinder 14b has a smaller radius than the top plate 14a. The top plate 14a is connected to the second ring 13b of the cylindrical basket 13 to close the upper opening 13f of the cylindrical basket 13.

In assembling the silencer for an air conditioner according to the present embodiment, first, the reference microphone mounting member 3 including the reference microphone 2 is attached to the duct base 1. The first duct 4 is then connected to the duct base 1. The sound absorbing material 5 and the holder 6 are attached to the first duct 4. In addition, the speaker 8 and the speaker baffle 9 including the back enclosure 7 for the speaker are attached. On the other hand, the speaker baffle 9 with the error microphone 10 is connected to the first duct 4. The second duct 12 is attached to the speaker baffle 9. The cylindrical basket 13 is connected to the second duct 12. The duct cover 14 is attached thereon. As a result, the silencer A for the air conditioner with an intake duct structure is assembled. The parts are coaxial with the central axis O (see FIG. 6) of the first duct 4.

In this manner, the silencer A is easily assembled simply by sequentially incorporating the parts.

Figure 6:
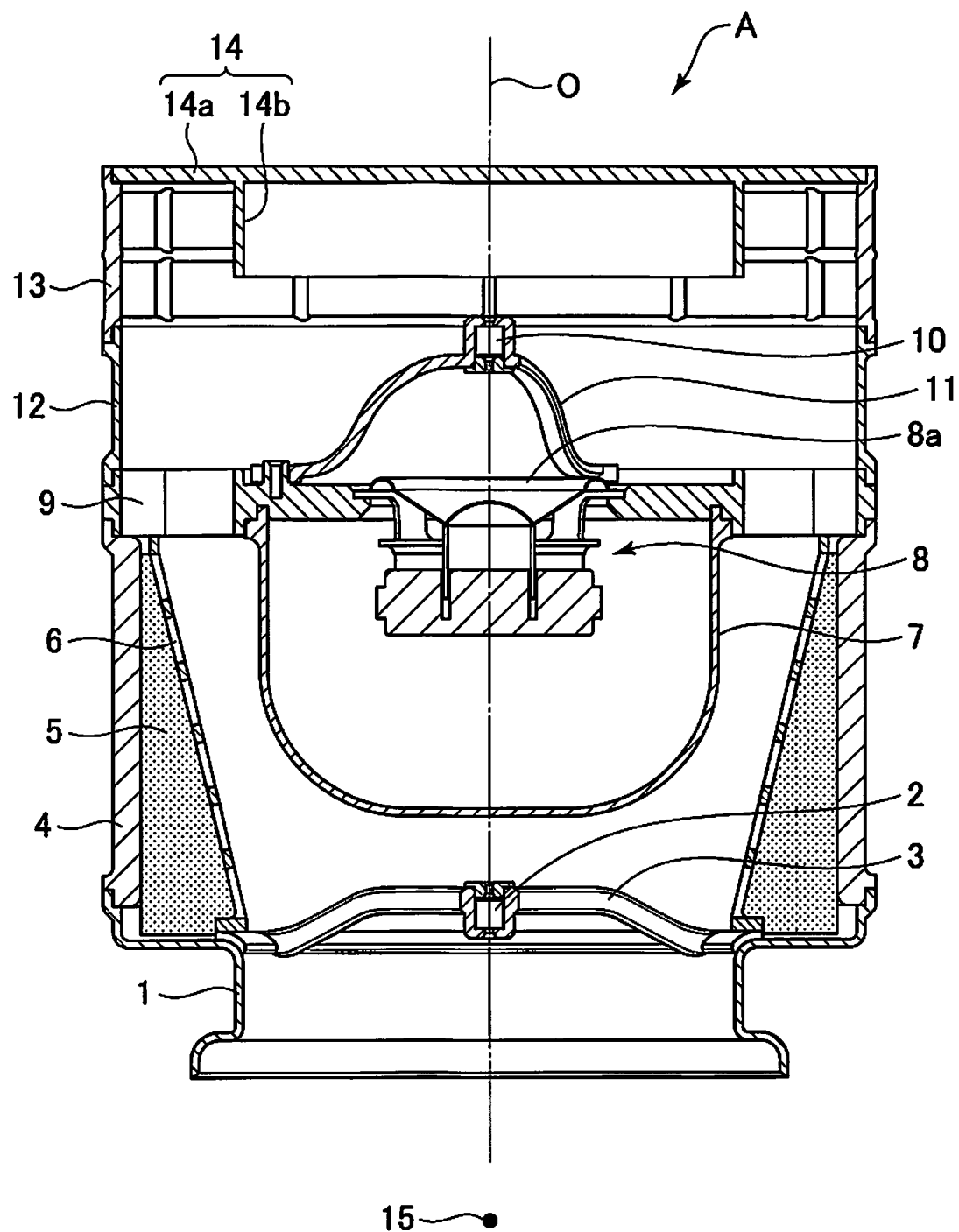
FIG. 6 is a side sectional view of the assembled silencer for the on-vehicle air conditioner according to the present disclosure.

FIG. 6 is a side sectional view of the assembled silencer A for the air conditioner according to this embodiment.

In this embodiment, the reference microphone 2 detects sound from a noise source 15. While passing through the acoustic path, the noise becomes first plane waves. The diaphragm 8a of the speaker 8 emits second plane waves for canceling the first plane waves of the sound detected by the reference microphone 2. In this case, the reference microphone 2 is as close to the noise source 15 as possible and far from the speaker 8 to some extent. In other words, the distance between the reference microphone 2 and the speaker 8 is set to obtain a time for signal processing.

The first duct 4 contains the back enclosure 7 for the speaker with a U-shaped side section. Accordingly, the sound waves from the noise source 15 pass between the outer circumferential surface of the back enclosure 7 for the speaker and the inner circumferential surface of the first duct 4. At this time, a narrow acoustic path is formed between the inner circumferential surface of the first duct 4 and the outer circumferential surface of the back enclosure 7 for the speaker to convert the noise into the first plane waves.

The principle of generating plane waves will be described later.

The error microphone 10 that detects the second plane waves from the speaker 8 is spaced apart from the speaker 8 at a distance equal to or longer than a duct diameter. The duct diameter is the interval between the inner circumferential surface of the first duct 4 and the outer circumferential surface of the back enclosure 7 for the speaker as will be described later.

Figure 7:
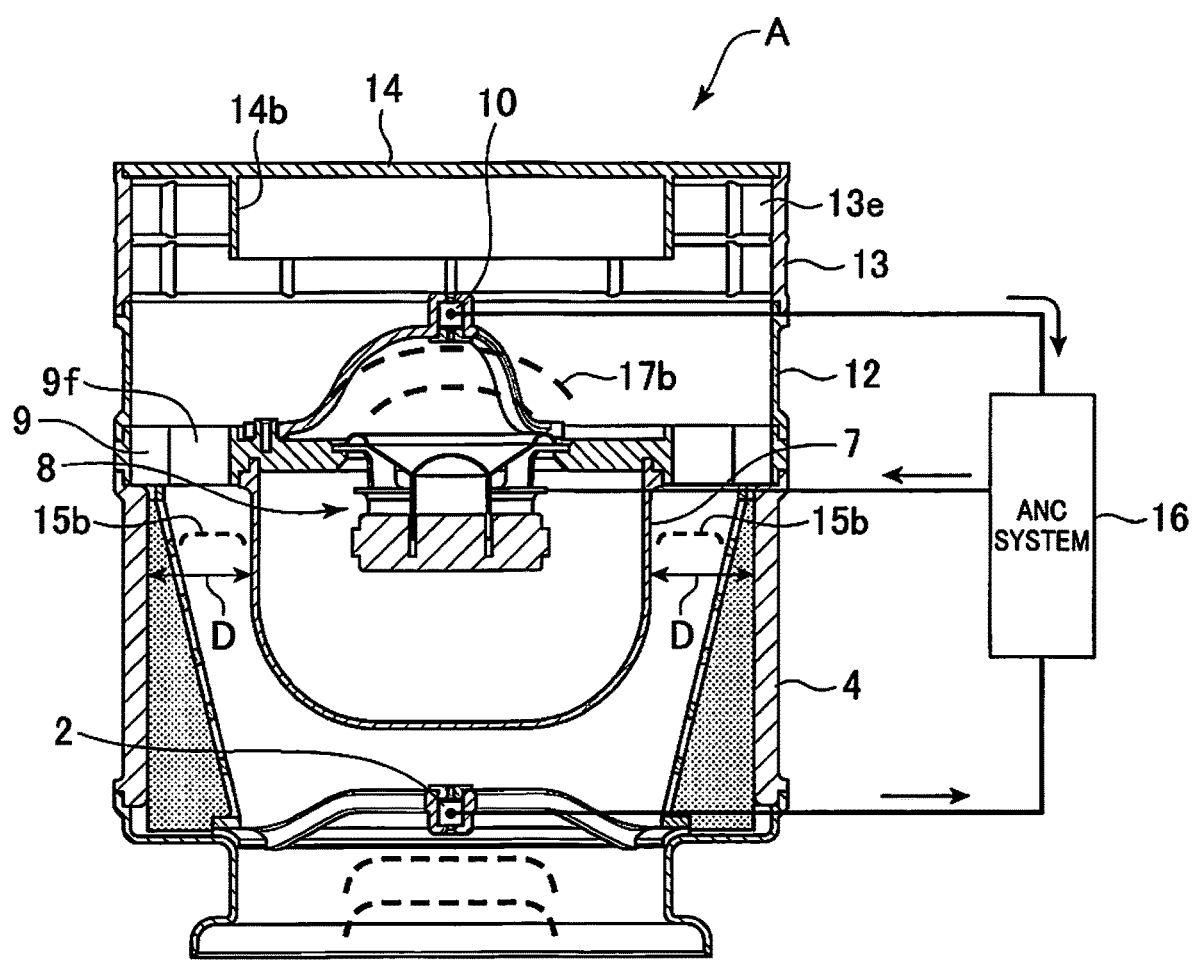
FIG. 7 illustrates an ANC system connected to the silencer for the on-vehicle air conditioner.

FIG. 7 illustrates an ANC system 16 connected to the silencer A. This ANC system 16 employs feedforward control. This type of ANC system 16 is known. The ANC system 16 includes the reference microphone 2 for detecting sound, the error microphone 10, and a controller for processing signals from the reference microphone 2 and the error microphone 10. In an operation, the system causes the controller to generate a signal obtained by convolving a transfer function with a signal detected by the reference microphone 2 as a secondary sound source. The system then updates a filter coefficient so that a signal detected by the error microphone 10 indicates zero to eliminate the sound. An example of this circuit will be described later.

Figure 9:
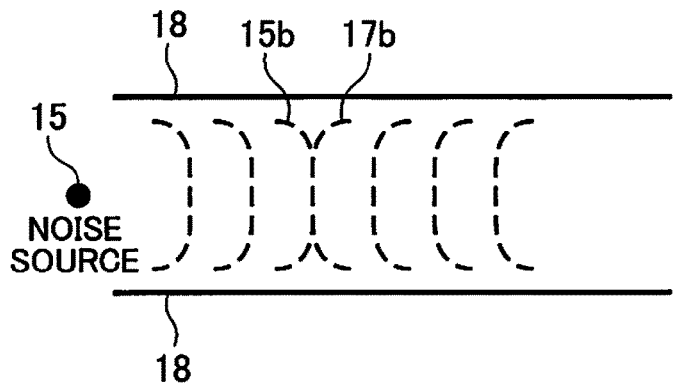
FIG. 9 illustrates the operation principle of the present disclosure.

In this embodiment, the inner circumferential surface of the first duct 4 and the outer circumferential surface of the back enclosure 7 for the speaker spaced inside and opposed to the first duct 4 function as two walls 18 shown in FIG. 9, and form a ring-like tube. The distance between the two walls 18, which corresponds to a tube diameter D shown in FIG. 10 is set so that noise within a low-frequency range has first plane waves 15b.

Figure 8:
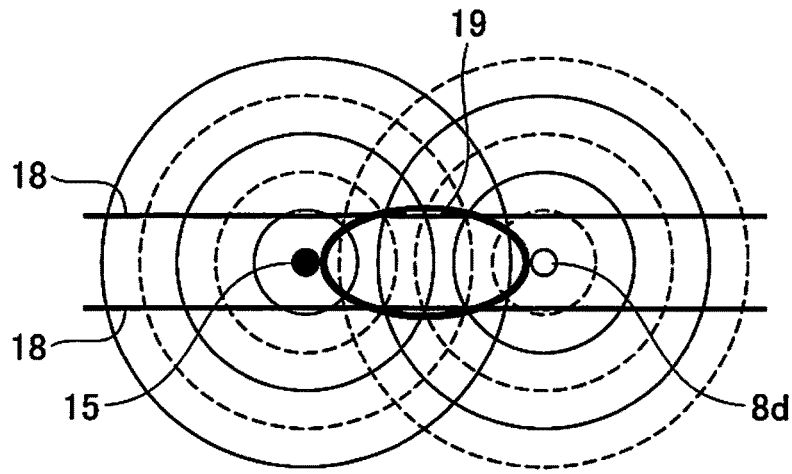
FIG. 8 illustrates an operation principle of the present disclosure.

FIG. 8 shows the principle of generating the first plane waves. The sound waves from the noise source 15 tend to spread like a circle. The walls 18, however, form a tubular acoustic path to reduce the spread so that the waves in the walls 18 are plane waves. That is, substantially plane waves are generated inside the walls 18 as surrounded by the ellipse 19 at the center of FIG. 8. In this case, the waves with a longer wavelength are flatter. In FIG. 8, reference character 8d on the right denotes a sound source of the speaker 8. Sound with an opposite phase to the noise source 15 cancels the noise. The phases of the waves spreading in a circle are indicated by solid and dashed lines which show that the noise source 15 on the left and the sound source 8d on the right have opposite phases. In the case of plane waves, as shown in FIG. 9, the first plane waves 15b propagate in one direction. In general, this state is called a "one-dimensional sound field". The first plane waves 15b can be canceled by second plane waves 17b.

Figure 10:
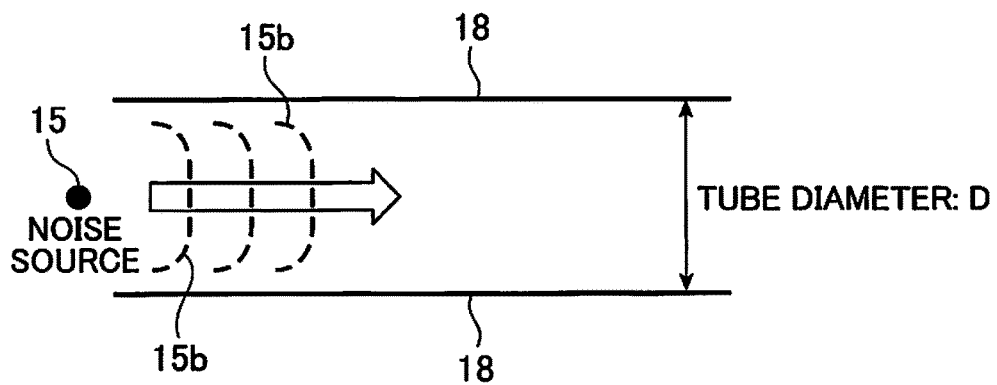
FIG. 10 illustrates the operation principle of the present disclosure.

The frequency of the plane waves depends on the tube diameter D of the acoustic path formed by the tubular walls 18, as shown in FIG. 10. A frequency f, a sound speed C, and a diameter D of the acoustic path satisfy the following expression.

$$f < 0.586c/D$$

In this embodiment, the sizes of the inner circumferential surface of the first duct 4 and the opposed outer circumferential surface of the back enclosure 7 for the sound speaker are set so that the noise from the noise source 15 in a low-frequency range from 100 Hz to 1000 Hz has the first plane waves 15b. That is, a high-cut structure is formed to remove a high-frequency component. The high-frequency component is eliminated by the PNC effect using the sound absorbing material 5.

Figure 11:
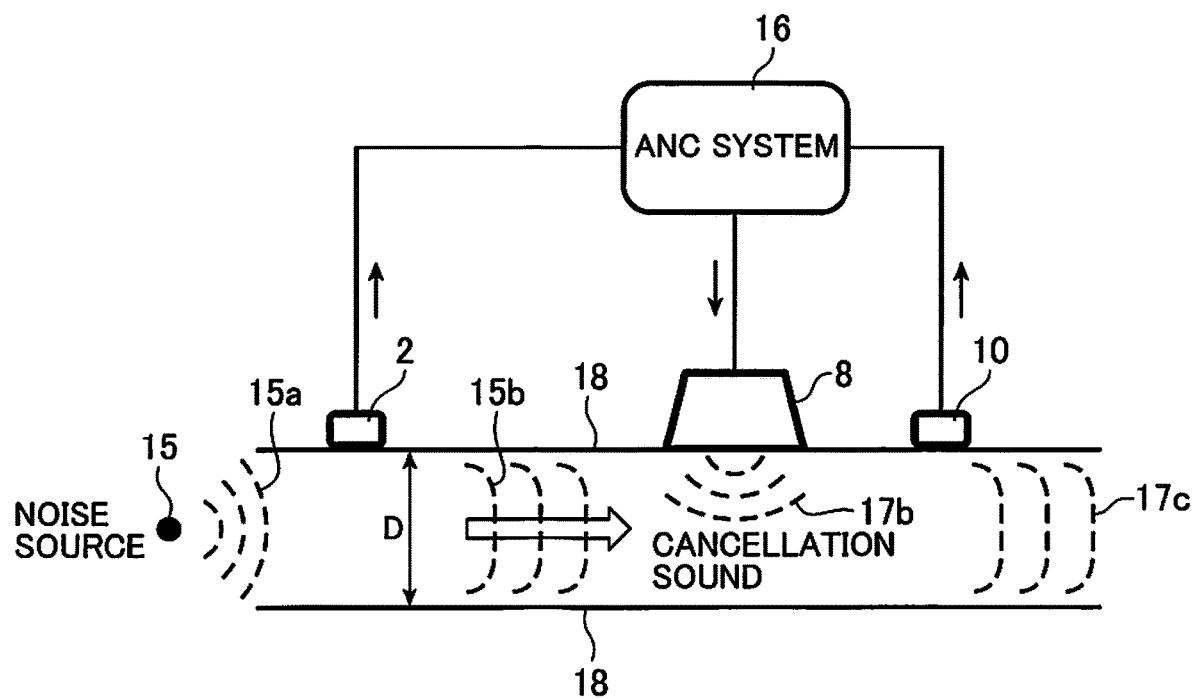
FIG. 11 illustrates the operation principle of the present disclosure.

FIG. 11 shows that the speaker 8 emits cancellation sound 17b for canceling the first plane waves 15b generated in accordance with the tube diameter D as shown in FIG. 10, using the ANC system 16. As shown in FIG. 9, the cancellation sound 17b corresponds to the second plane waves 17b with an opposite phase to cancel the first plane waves. The error microphone 10 detects the sound in the second duct 12 and sends a signal to the ANC system 16 which causes the speaker 8 to emit the second plane waves 17*b* as the corrected cancellation sound and discharge sound 17*c* after the cancellation outside at the end.

Figure 12:
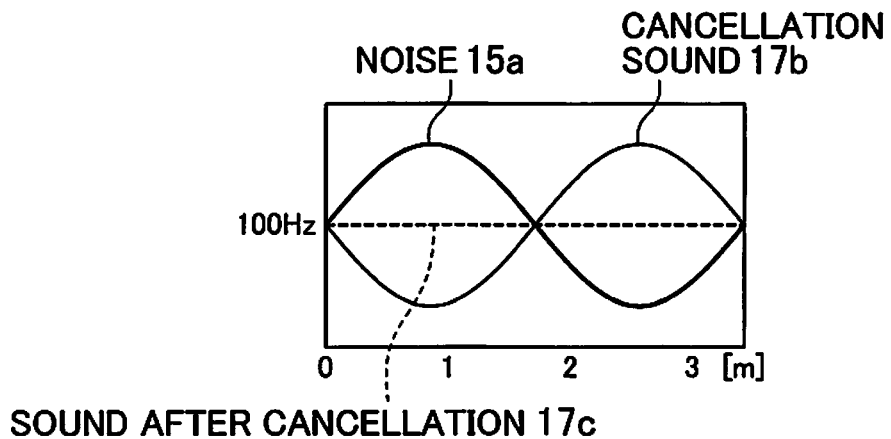
FIG. 12 illustrates a principle of silencing by canceling the phase of noise from a noise source by an ANC system according to the present disclosure.

FIG. 12 illustrates the sound 17*c* after cancellation shown in FIG. 11 using the cancellation sound 17*b* from the speaker 8. The cancellation sound 17*b* is indicated by the thinner line and has an opposite phase to noise 15*a* indicated by the thicker line.

Figure 13:
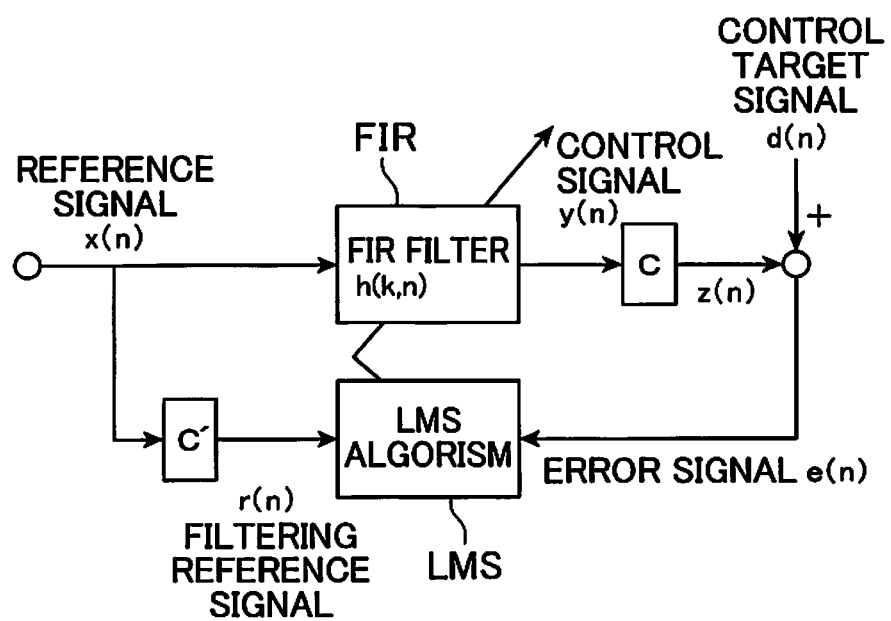
FIG. 13 is a block diagram showing an example configuration of the ANC system used in the present disclosure.

FIG. 13 shows an example circuit of the ANC system 16.

A reference signal x (n) corresponding to noise input to the reference microphone 2 is sent to an FIR filter circuit FIR. The FIR filter circuit FIR is connected to an LMS algorithm circuit LMS that receives an error signal e (n) obtained by superimposing a control target signal d (n) detected by the error microphone 10 and a signal z (n) having transfer characteristics between the speaker 8 and the error microphone 10 and reaching a control point.

In the figure, the FIR filter circuit FIR has h (k, n) as a filter coefficient vector of an FIR filter. Reference character C represents secondary path characteristic, which are transfer characteristics of the acoustic system from the speaker 8 to the error microphone 10. C' represents secondary path characteristics, which are transfer characteristics measured in advance. The signals are sent from the FIR filter circuit FIR to the speaker 8. The arrows mean "variable". The filter is updated so that the error microphone 10 has an acoustic pressure of zero. The signal updated to have a most suitable filter coefficient is sent to the speaker 8 to cancel the first plane waves 15*b*.

Figure 14:
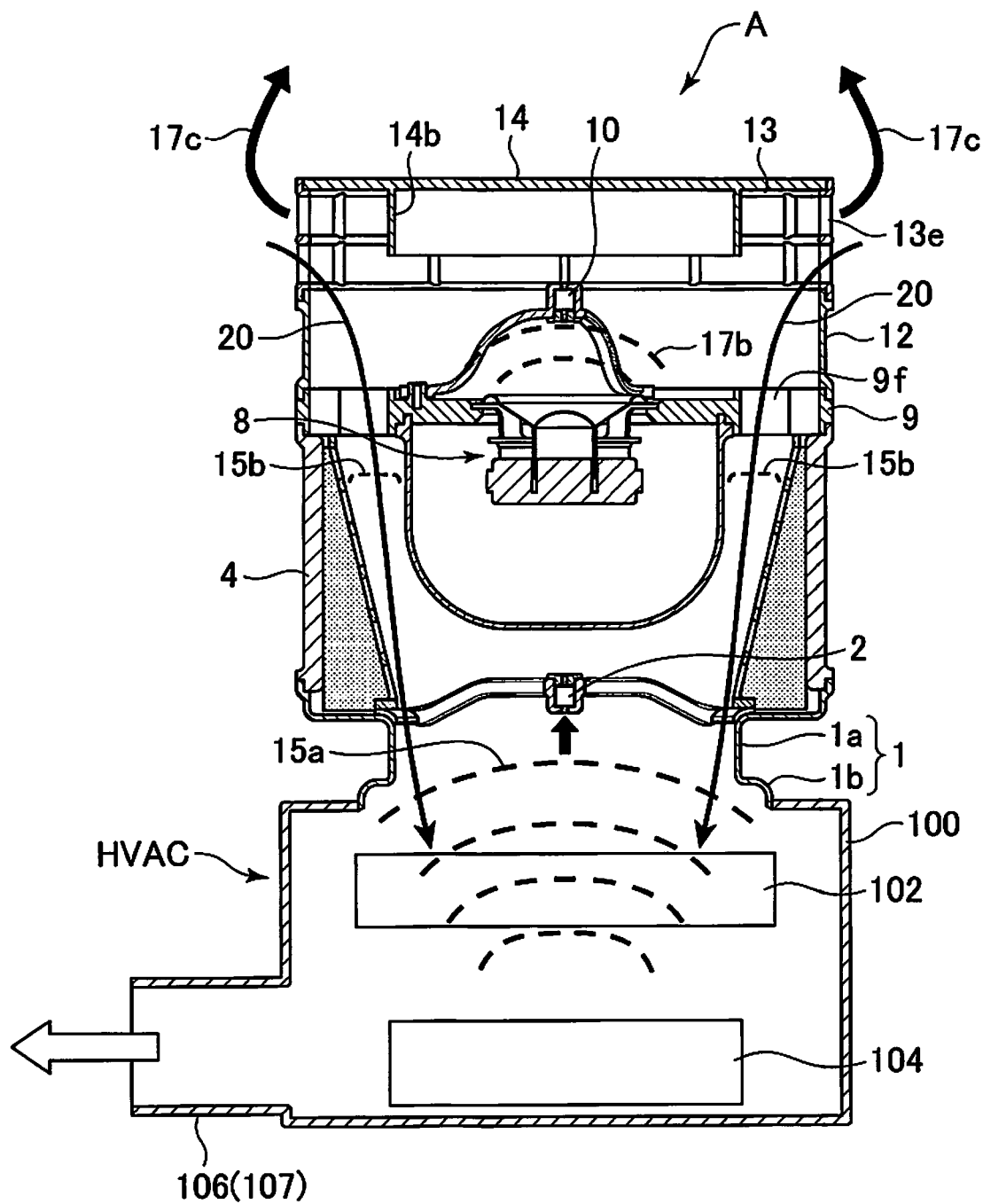
FIG. 14 illustrates an intake flow, the states of first and second plane waves, and a flow of cancellation sound in the silencer for the on-vehicle air conditioner according to the embodiment.

FIG. 14 illustrates flows of intake air and the sound 17*c* after cancellation in the silencer A for an air conditioner.

The noise 15*a* from the noise source 15 such as the fan 102 or the evaporator 104, for example, of the HVAC system is detected by the reference microphone 2 as described above. The detection signal is input to and processed by the ANC system 16 as shown in FIG. 7.

The noise 15*a* is converted into the first plane waves 15*b* in the first duct 4, passes through the vent 9*f* of the speaker baffle 9, and enters the second duct 12.

The second duct 12 contains the second plane waves 17*b* with an opposite phase to the first plane waves 15*b* from the speaker 8, which cancels the first plane waves 15*b*.

That is, a control target signal, which is an error signal incompletely eliminated in the second duct 12, is detected by the error microphone 10 and input to the ANC system 16. An update signal corrected as appropriate by the ANC system 16 is sent to the speaker 8 which outputs appropriate second plane waves 17*b* for canceling the first plane waves 15*b*. Accordingly, the first plane waves 15*b* are canceled, and the sound 17*c* after the cancellation is discharged outside though the vents 13*e* of the cylindrical basket 13.

The sound 17*c* after the cancellation is reduced to a level at which the noise 15*a* is not hard on the ears, as will be described later.

Next, a process of reducing noise will be described.

Figure 15:
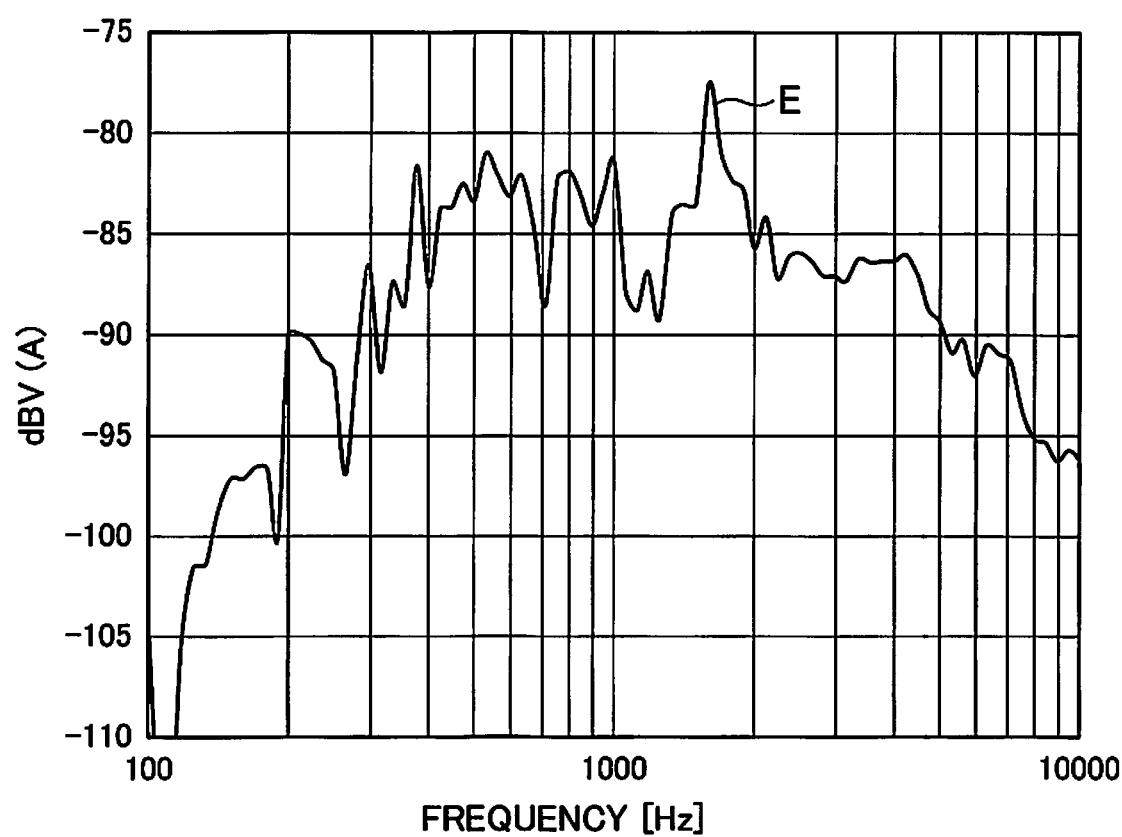
FIG. 15 shows frequency characteristics of noise from a noise source. The horizontal axis represents the frequency, whereas the vertical axis represents the sound pressure.

FIG. 15 shows noise characteristic E of the noise source 15 itself generated when the HVAC is activated. The horizontal axis represents the frequency, whereas the vertical axis represents the sound pressure. Noise is generated in a wide frequency range.

Figure 16:
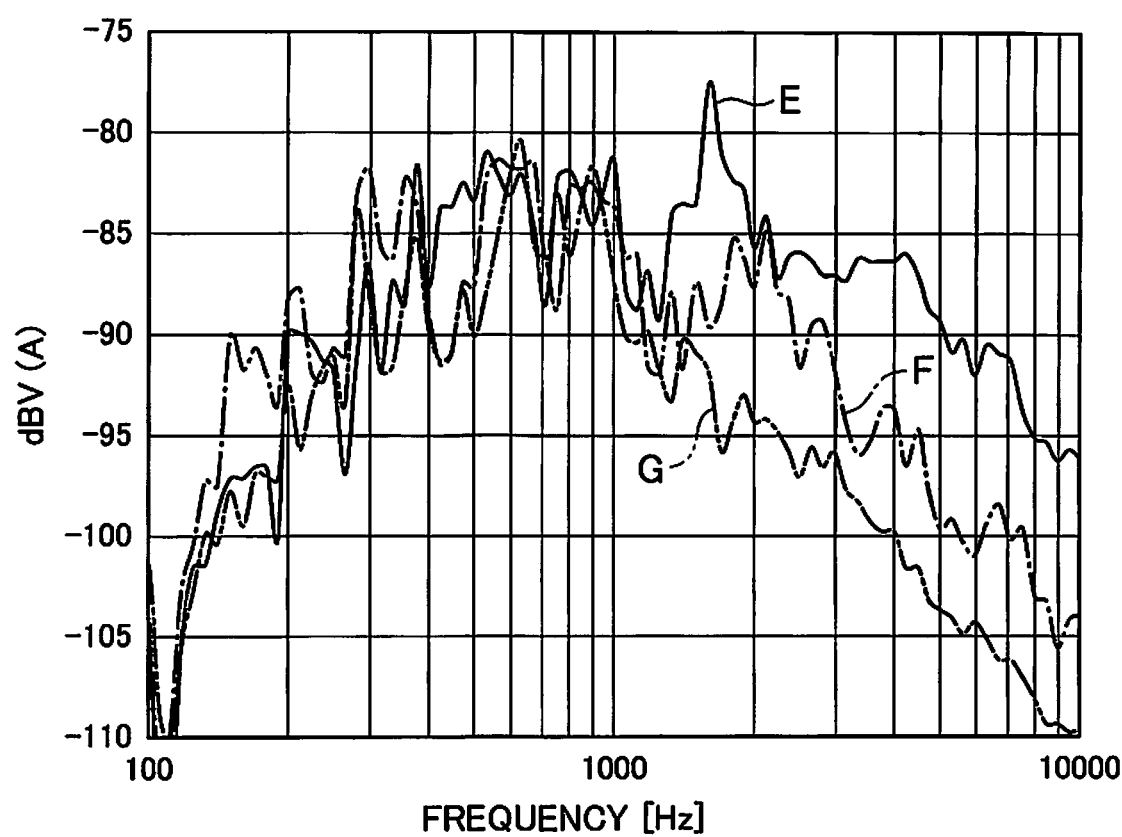
FIG. 16 shows sound absorption (i.e., silencing) characteristics when a back enclosure including a speaker and a speaker baffle is set in the first duct according to the embodiment.

FIG. 16, the one-dot chain line F represents silencing characteristics of the silencer A for the air conditioner including the first duct 4 with the speaker unit (i.e., the speaker 8, the speaker baffle 9, and the back enclosure 7), and the duct cover 14, for example, above the fan 102 of the case 100 of the HVAC system, that is, without the sound absorbing material 5. In this case, the silencer attenuates the sound at a frequency of 1500 Hz and more than 3000 Hz. The two-dot chain line G represents silencing characteristics of the silencer A for the air conditioner with built-in sound absorbing material 5 and holder 6. In this case, the silencer further attenuates the sound at a frequency of 1500 Hz or more.

Figure 17:
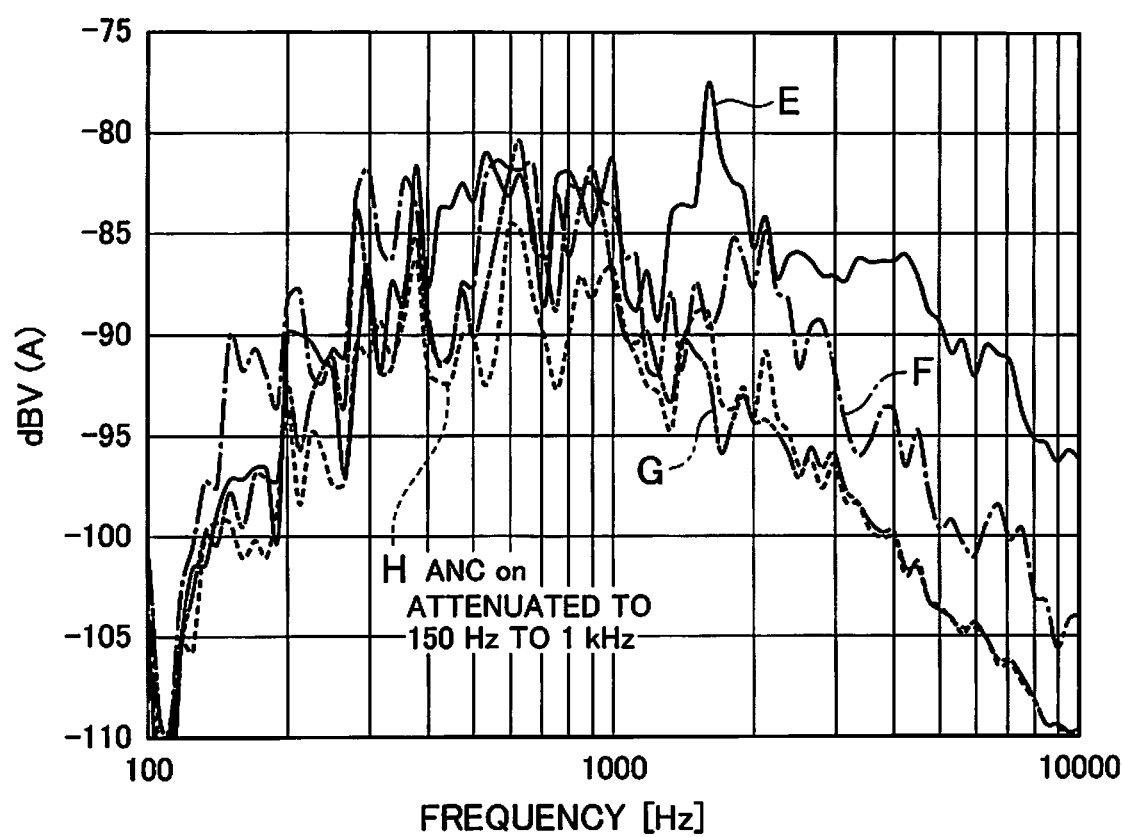

In FIG. 17, the broken line H represents silencing characteristics when the ANC system 16 operates, which reduces noise within a range from 150 Hz to 1000 Hz.

Figure 18:
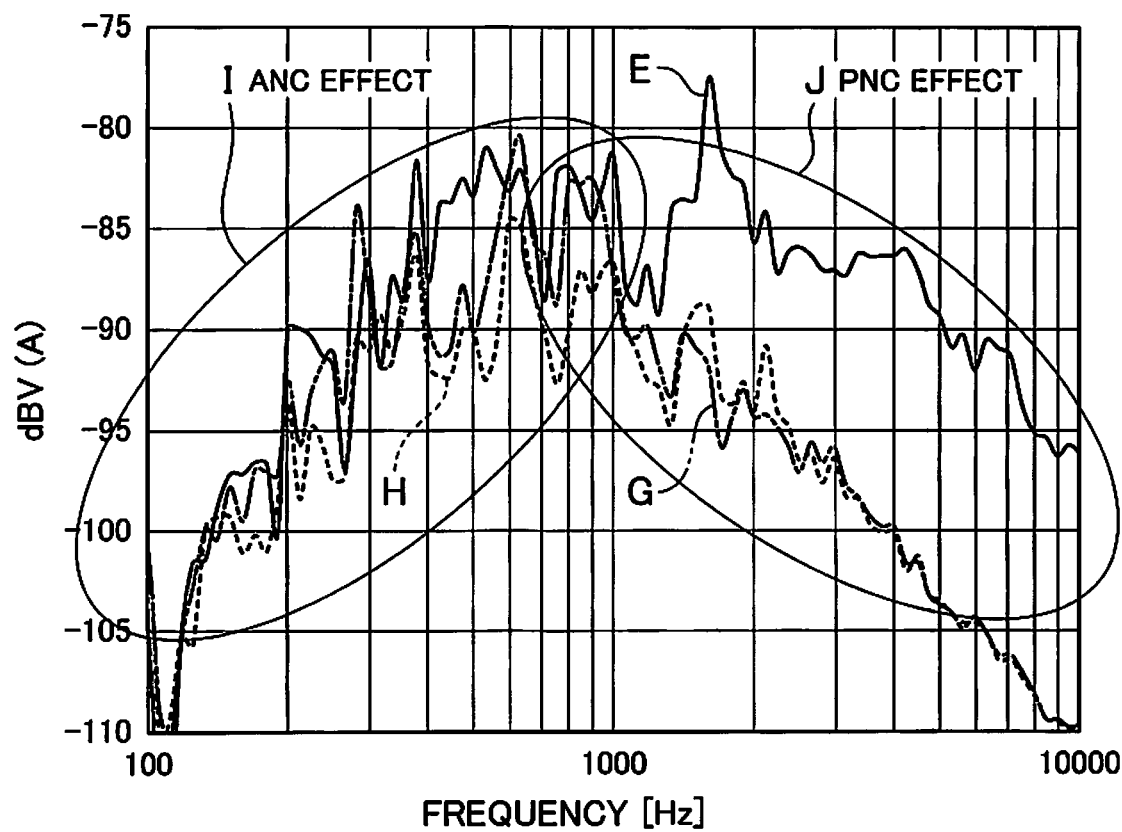
FIG. 18 illustrates ANC and PNC effects of a sound absorbing material in the embodiment.

As described above, as surrounded by the ellipse I in FIG. 18, the sound with a frequency within a range I from 100 Hz to about 1000 Hz is eliminated by the ANC effect. As surrounded by then ellipse J, in a frequency range of 1000 Hz or more, the noise hard on the ears from the on-vehicle air conditioner is eliminated by the PNC effect of the sound absorbing material 5.

Note that the silencer A for an air conditioner according to the present disclosure is applicable not only to a three-row seat vehicle but to other vehicles such as a camping car. The silencer A is also applicable in fields other than vehicles.

DESCRIPTION OF REFERENCE CHARACTERS

1. Duct Base
2 Reference Microphone
3 Reference Microphone Mounting Member
3*b* Microphone Mount
4 First Duct
5 Sound Absorbing Material
6 Holder for Sound Absorbing Material
7 Back Enclosure for Speaker
8 Speaker
8*d* Sound Source of Speaker
9 Speaker Baffle
9*d* Mounting Plate
9*f* Vent
10 Error Microphone
11 Error Microphone Mounting Member
11*a* Microphone Mount
12 Second Duct
13 Cylindrical Basket as Intake and Sound Discharge Member
13*e* Vent
13*f* Upper opening
14 Duct Cover
15 Noise Source
15*a* Noise
15*b* First Plane Waves
16 ANC System
17*b* Cancellation Sound (Second Plane Waves)
17*c* Sound after Cancellation
18 Wall
19 Area Surrounded by Ellipse
20 Outside Air
100 Case
101 Air Inlet
102 Fan
103 Radiator
104 Evaporator
105 Shutter
106 Duct
107 Duct
HVAC On-Vehicle Air Conditioner
A Silencer for Air Conditioner
E Silencing Characteristics of HVAC System in Operation F Silencing Characteristics When Silencer A for Air Conditioner without Sound Absorbing Material Is Mounted on HVAC System
Absorbing Material Is Mounted on HVAC System
G Silencing Characteristics When Silencer A for Air Conditioner with Built-In Sound Absorbing Material is Mounted
H Silencing Characteristics in Operating ANC System 16
I Silencing Effect of ANC
J Silencing Effect of PNC

The invention claimed is:

1. A silencer for an air conditioner, the silencer comprising:
   a first duct in a cylindrical shape at a noise outlet, the first duct including a reference microphone that detects noise as a reference signal;
   a speaker baffle on a top of the first duct, the speaker baffle having a circular shape as whole in a plan view and including a speaker around a center thereof;
   a back enclosure for the speaker, the back enclosure being on a back surface of the speaker baffle;
   a second duct that is in a shape of a cylinder and connected to a top of the speaker baffle;
   an error microphone in the second duct and above a diaphragm of the speaker at a distance to detect a control target signal that is an incompletely eliminated error signal;
   a cylindrical body for intake connected to a top of the second duct;
   a duct cover for enclosing an upper opening of the cylindrical body; and
   a gap that is between an inner circumferential surface of the first duct and an outer circumferential surface of the back enclosure for the speaker an serves as an acoustic path of noise to provide a plane wave, the noise being in a form of a first plane wave, the error microphone being configured to detect an error signal in the second duct, the speaker being configured to output a second plane wave with a phase opposite to a phase of the first plane wave.

2. The silencer of claim 1, further comprising:
   an ANC system connected to the speaker, wherein
   the reference signal detected by the reference microphone is input to the ANC system connect to the reference microphone,
   the control target signal of the error microphone is input to the ANC system, an output of the ANC system is applied to the speaker connected, and the speaker sends out the second plane wave.

3. The silencer of claim 1, wherein
   the acoustic path in the first duct includes a sound absorbing material.

4. The silencer of claim 1, wherein
   the duct cover has an inner surface including a cylinder serving as a wind shield and a reinforcement for the error microphone.

5. The silencer of claim 1, wherein
   the back enclosure of the speaker has a U-shaped side section.

* * * * *